Figure 1:
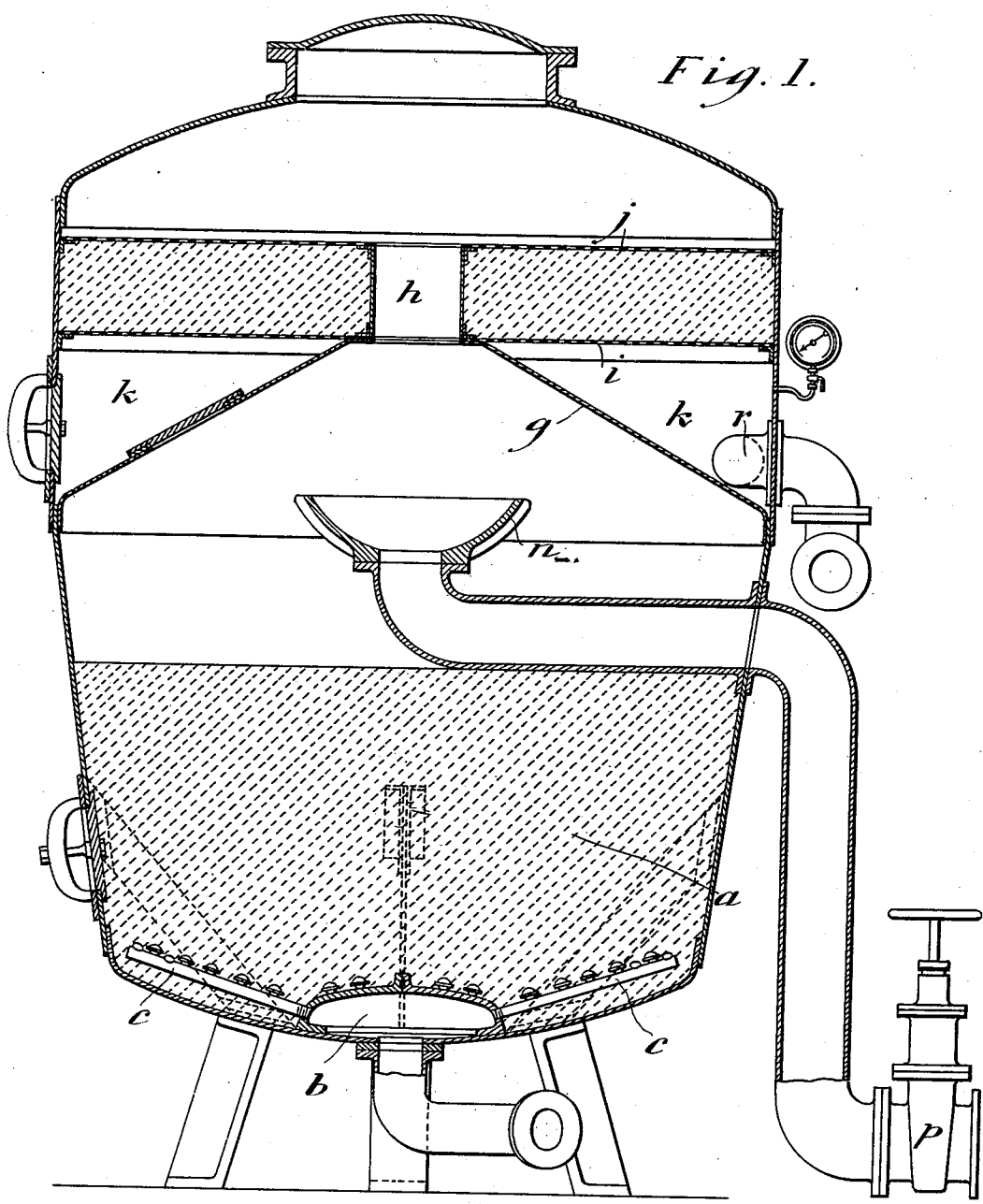

No. 650,611. Patented May 29, 1900.
W. REEVES.
FILTER FOR LIQUIDS.
(Application filed Feb. 15, 1900.)

(No Model.) 3 Sheets—Sheet 1.

Witnesses Inventor

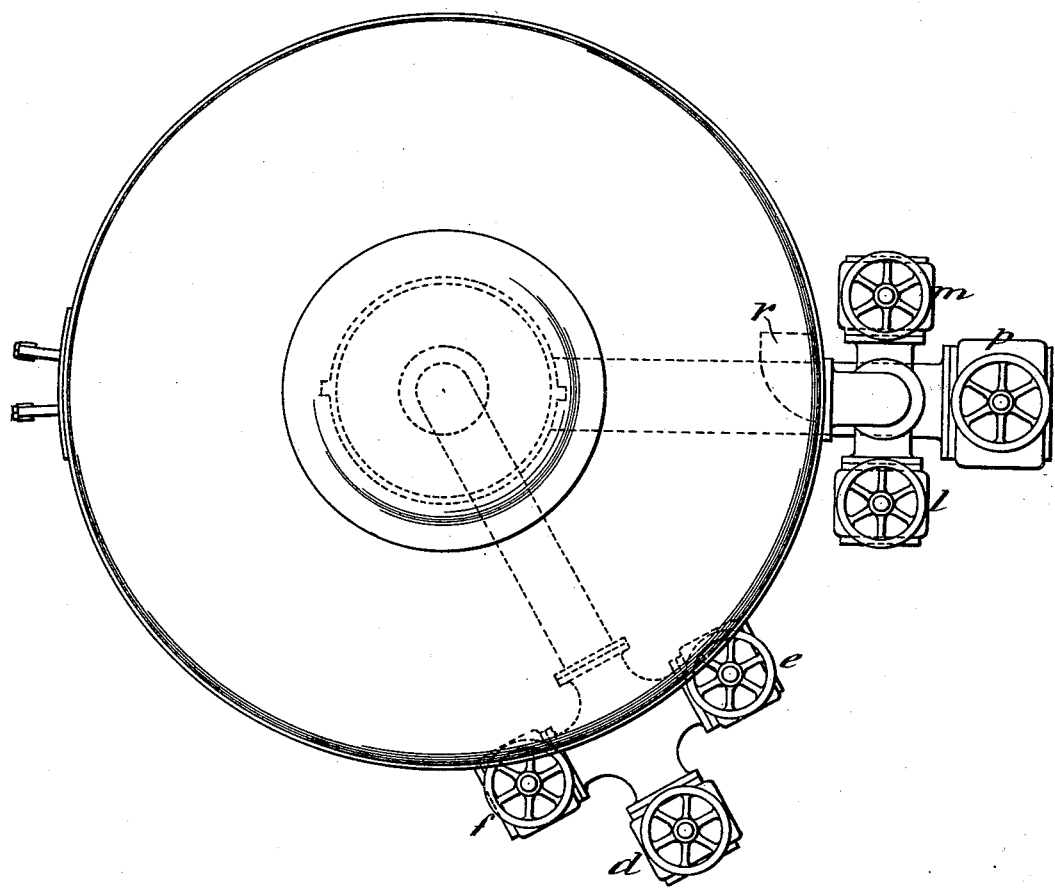

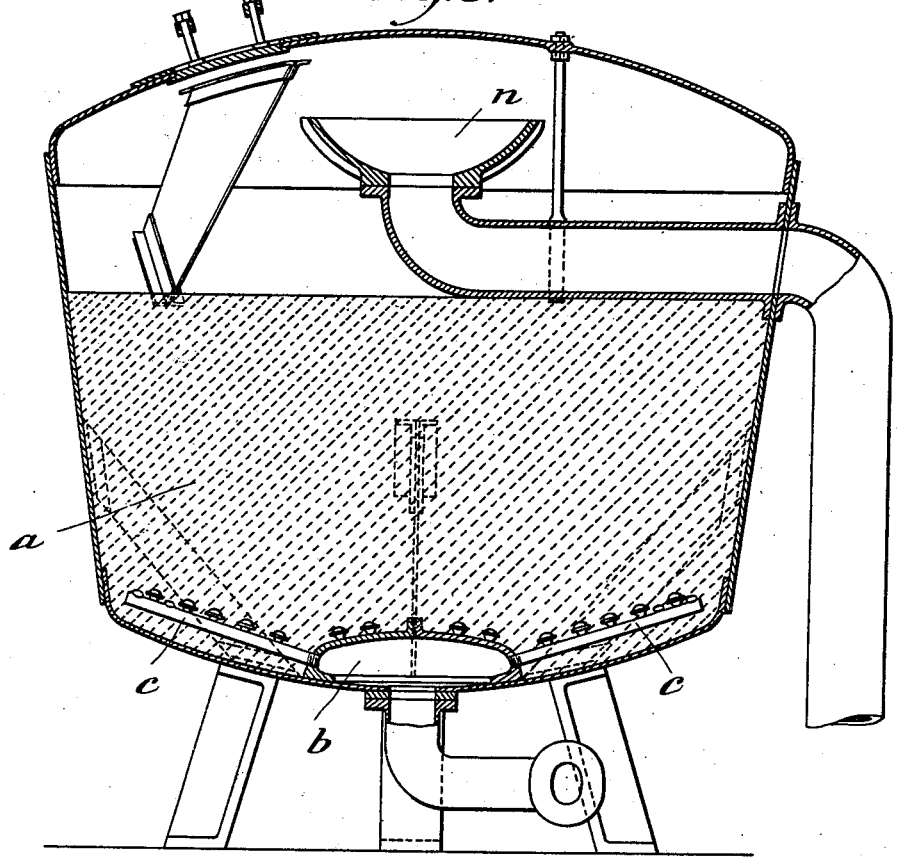

UNITED STATES PATENT OFFICE.

WILFRED REEVES, OF LONDON, ENGLAND, ASSIGNOR TO THE REEVES PATENT FILTERS COMPANY, LIMITED, OF SAME PLACE.

FILTER FOR LIQUIDS.

SPECIFICATION forming part of Letters Patent No. 650,611, dated May 29, 1900.

Application filed February 15, 1900. Serial No. 5,303. (No model.)

*To all whom it may concern:*

Be it known that I, WILFRED REEVES, a citizen of England, residing at 9 Fenchurch avenue, in the city of London, England, have invented certain new and useful Improvements in Filters for Liquids, (for which applications for patents have been filed in Great Britain, dated January 27, 1900, No. 1,764; in France, dated January 30, 1900, and in Belgium, dated January 30, 1900,) of which the following is a specification.

In the specification of Patent No. 617,771, dated January 17, 1899, is described a filter having its lower part which holds the filtering material tapering to a smaller diameter at the bottom and provided with annular channels at its circumference for discharge of liquid when the filter is cleansed. There was also provided in the upper part of the filter a settling-chamber and primary filter, through which the liquid to be filtered had to pass before reaching the main filtering-bed. The present invention relates to modifications of such filters, whereby their construction is simplified and the operation rendered more efficient, as will be described with reference to the accompanying drawings.

Figure 1 is a vertical section, and Fig. 2 is a plan, of a filter according to the present invention for filtering liquid under pressure. Fig. 3 is a vertical section of a modified construction in which the settling-chamber and primary filter are dispensed with.

Corresponding parts in all the figures are denoted by like letters of reference.

Referring first to Figs. 1 and 2, the main filter-bed $a$ occupies the lower part of the structure, which tapers to a smaller diameter at the bottom and is there provided with a hollow crown $b$, from which pipes $c$, with nozzles, radiate. The interior of the crown $b$ communicates by a branching pipe with three valves $d$ for the issue of the filtered liquid $e$ for entrance of cleansing liquid and $f$ for issue of first filtered water after cleansing. The upper part of the structure has a conical partition $g$, having an open pipe $h$ at its top, the space $k$ between the partition $g$ and the outer wall forming a settling-chamber of general tapering or triangular shape from the outer wall to the center, above which are two perforated plates $i\ j$, having primary filtering material, such as quartz granules, between them. The chamber $k$ communicates by a branched pipe with two valves $l$ for inlet of liquid to be filtered and $m$ for draining the chamber $k$. Above the main filter is fixed a cup $n$, communicating by a pipe with a valve $p$ for issue of the foul clensing liquid. The pipe from the valves $l\ m$ is provided with a bend $r$ inside the chamber $k$, which causes the water to flow around the chamber.

The filter operates as follows: Liquid to be filtered enters by the valve $l$ to the settling-chamber $k$, passes up through the plates $i\ j$ and the primary filter between them, descends by the pipe $h$ and the body of the filter, diffuses itself over the main filter through which it descends, passes through the nozzles into the radiating pipes $c$ and crown $b$, and issues by the valve $e$. A wash in the reverse direction is effected by supplying clean liquid by the valve $e$. This rises through the main filter, enters the cup $n$, and passes away by the valve $p$. The chamber $k$ can be drained through the valve $m$.

In some cases where the liquid to be filtered is not very foul the settling-chamber $k$ and the primary filter above it may be dispensed with, as shown in Fig. 3. In this case the liquid to be filtered enters by a valve and pipe leading to the cup $n$. It overflows the cup, descends through the filter, and issues by a pipe and valve at the bottom. The filter is cleansed by supplying liquid by the valve $e$, and this liquid after passing through the filter issues by the cup $n$ and a pipe and valve. The first filtered liquid after the upward cleansing issues to waste through valve $f$.

Having thus described the nature of this invention and the best means I know of carrying the same into practical effect, I claim—

1. A filter for liquids comprising a vessel having its lower part tapering to a smaller diameter downward and charged with filtering material, and having in its upper part two perforated plates with filtering material between them, and under these a settling-chamber of triangular section, a valved pipe to the settling-chamber, a valved discharge-pipe from nozzles below the lower filtering material, a cup situated centrally above the said material and communicating with a valved outlet-pipe for discharge of fouled liquid from the cleansing of the filter, and valves for inlet and outlet of filtered and cleansing liquid, substantially as described with reference to Figs. 1 and 2.

2. A filter for liquids, comprising a vessel having its lower part tapering downwardly and charged with filtering material, a valved discharge-pipe from nozzles below the filtering material, a cup situated centrally above the material and communicating with a valved outlet-pipe for discharge of fouled liquid, and valves for inlet and outlet of the filtered and the cleansing liquids; substantially as described.

3. A filter for liquids, comprising a vessel having its lower part tapering downwardly, and charged with filtering material, and having in its upper part two perforated plates with filtering material between them, a settling-chamber underneath the upper bed and opening upwardly, a channel leading from the upper bed to the lower bed, a valved discharge-pipe from nozzles below the lower filtering material, a cup situated centrally above the said material and communicating with a valved outlet-pipe for discharge of fouled liquid from the cleansing of the filter, and valves for inlet and outlet of filtered and cleansing liquids, substantially as described.

In testimony whereof I have hereunto set my hand in presence of two subscribing witnesses.

WILFRED REEVES.

Witnesses:
ROBERT CARY,
OLIVER IMRAY.